(12) United States Patent
Comello et al.

(10) Patent No.: US 6,339,993 B1
(45) Date of Patent: Jan. 22, 2002

(54) DEVICE FOR PASSING THROUGH PIPES

(75) Inventors: Corry Comello, Scarborough; Poul Laursen; Jukka Maki, both of North York, all of (CA)

(73) Assignee: PII Pipetronix GmbH, Stutensee (DE)

( * ) Notice: Subject to any disclaimer, the term of this patent is extended or adjusted under 35 U.S.C. 154(b) by 0 days.

(21) Appl. No.: 09/173,444

(22) Filed: Oct. 16, 1998

(30) Foreign Application Priority Data

Oct. 22, 1997 (DE) .......................... 197 46 510

(51) Int. Cl.⁷ .......................... F16L 55/44; G01M 19/00
(52) U.S. Cl. .................... 104/138.2; 73/866.5
(58) Field of Search .............. 73/866.5, 865.8; 104/138.2

(56) References Cited

U.S. PATENT DOCUMENTS

| | | | |
|---|---|---|---|
| 3,495,546 A | * 2/1970 | Brown et al. ........... | 324/220 X |
| 4,458,601 A | * 7/1984 | Braithwaite et al. ..... | 104/138.2 |
| 4,601,204 A | * 7/1986 | Fournot et al. .......... | 73/866.5 |
| 4,646,787 A | * 3/1987 | Rush et al. ............. | 73/866.5 X |
| 4,677,865 A | * 7/1987 | Lehmann ................. | 73/866.5 |
| 4,769,598 A | * 9/1988 | Krieg et al. ............ | 73/643 X |
| 4,770,105 A | * 9/1988 | Takagi et al ........... | 73/866.5 X |
| 5,142,990 A | * 9/1992 | Leonard ................. | 104/138.2 |

FOREIGN PATENT DOCUMENTS

| | | |
|---|---|---|
| DE | 27 56 561 | 6/1979 |
| DE | 42 39 914 | 6/1994 |
| EP | 0 196 020 | 10/1986 |

* cited by examiner

*Primary Examiner*—Thomas P. Noland
(74) *Attorney, Agent, or Firm*—Paul Vincent

(57) ABSTRACT

A device (1) for passing through pipes in the form of a pig (1) moving through the pipe and guided on the inner wall thereof has at least one pig body (16) and support elements (8a) on the outer periphery thereof for guidance within the pipe as well as drive elements (10a, 10b) in the form of collars for transport in the pipe. The device is distinguished by improved entrance into the pipe conduit in that at least one of the collars (10a, 10b) can be radially expanded.

19 Claims, 4 Drawing Sheets

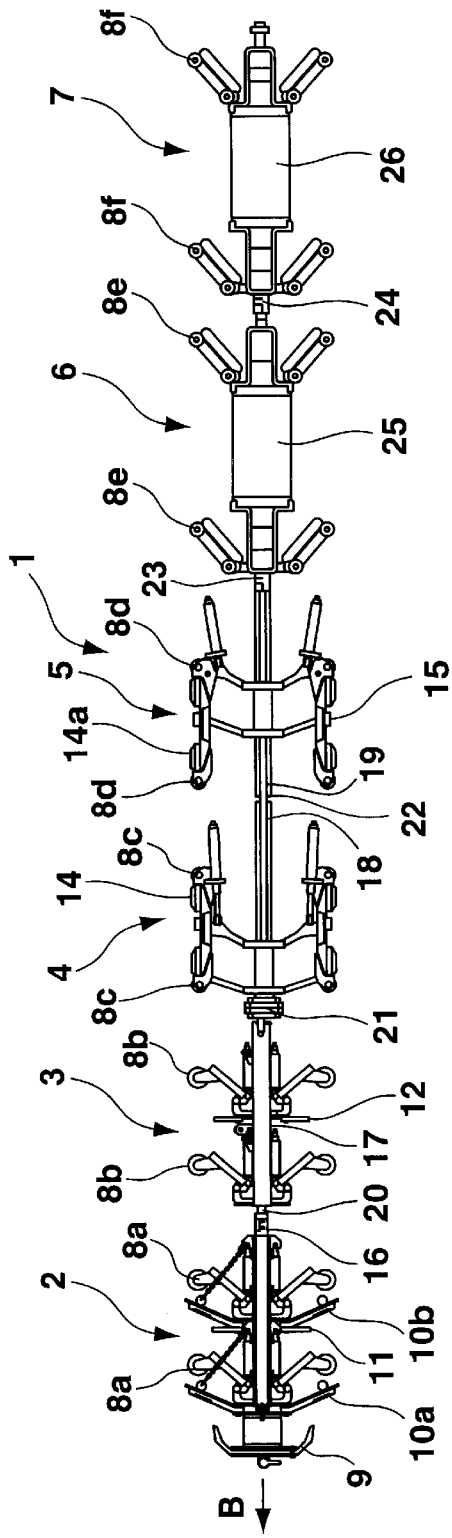
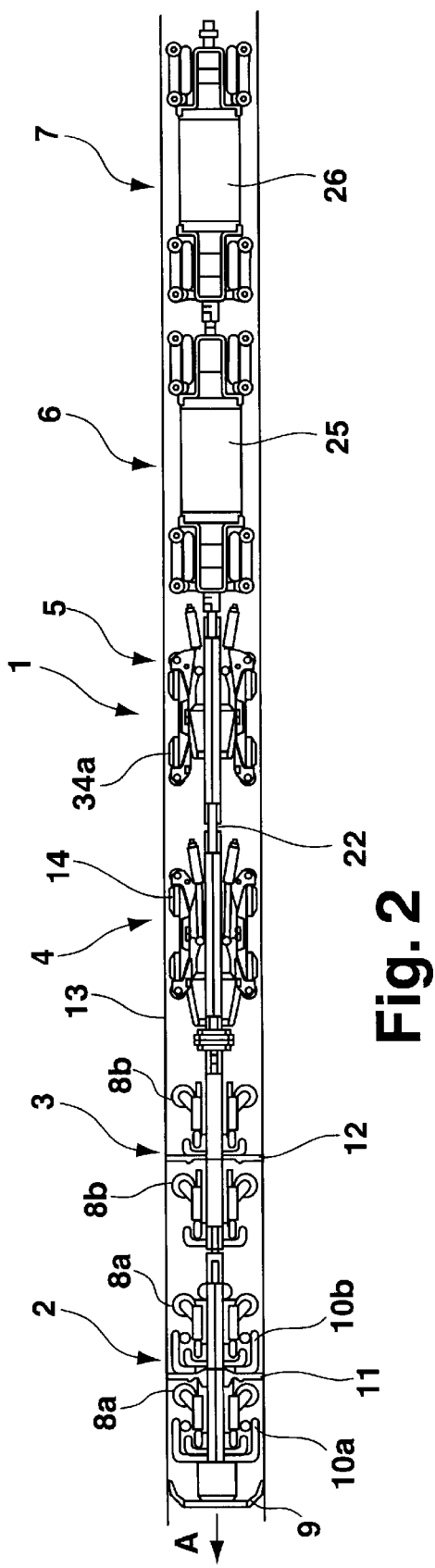
Fig. 1
Fig. 2

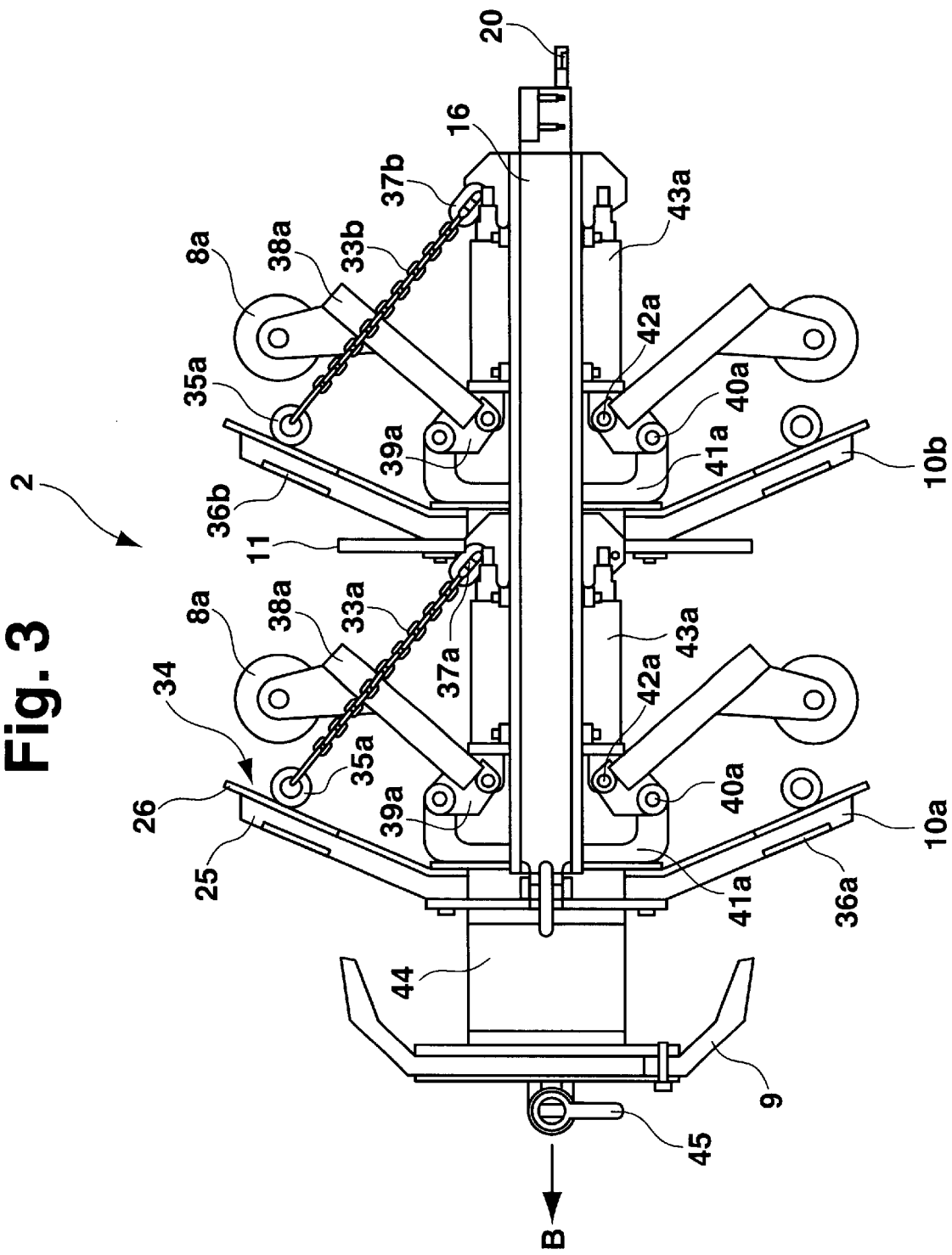

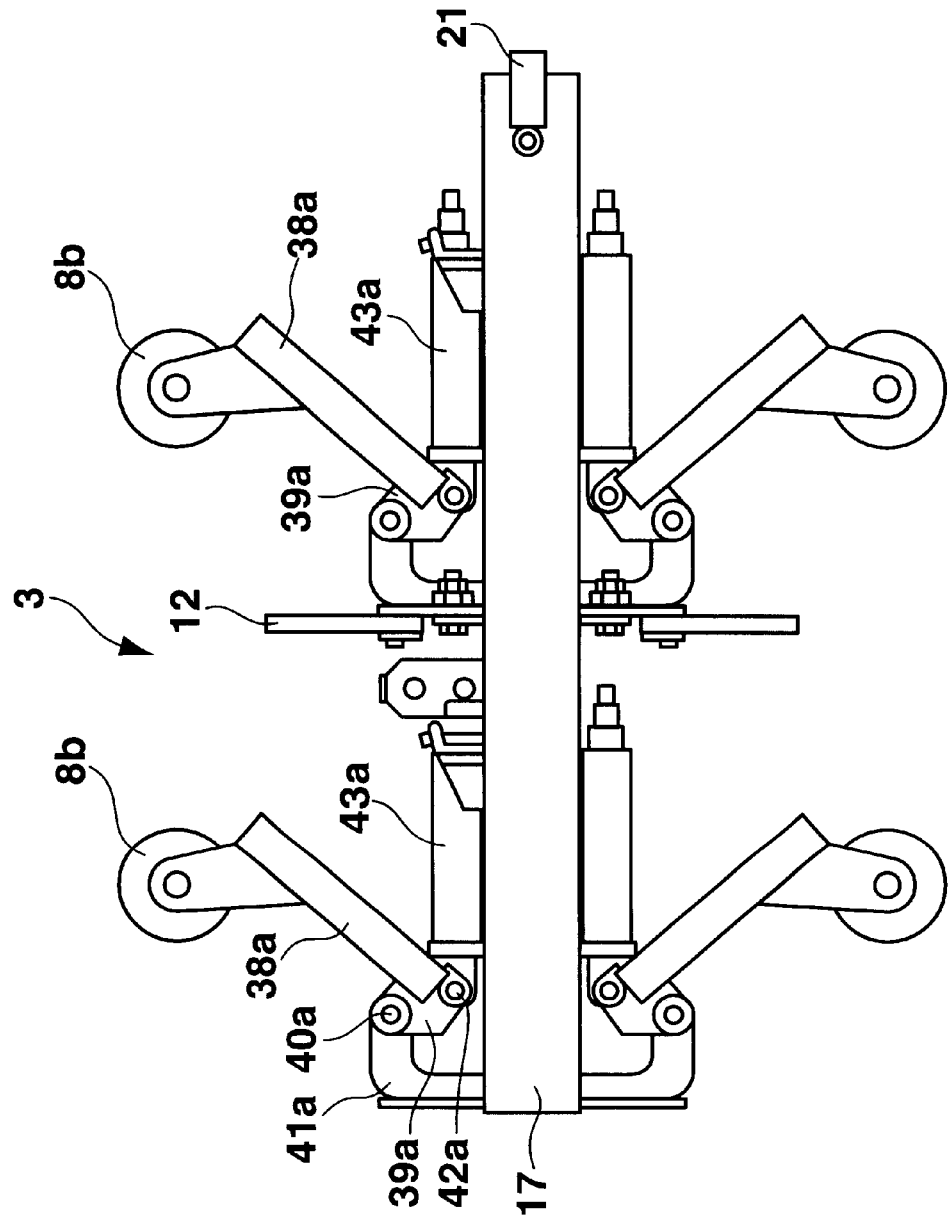

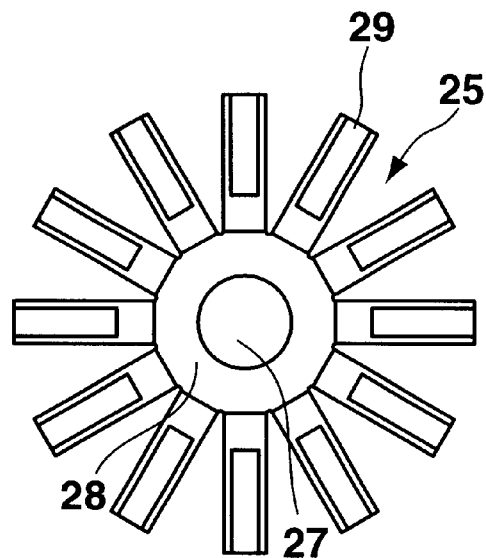
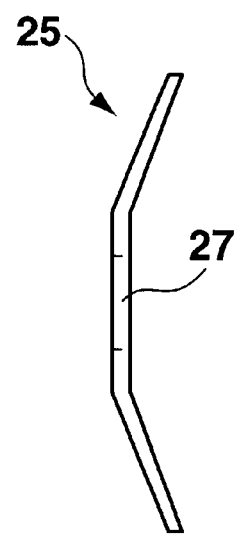
Fig. 5a  Fig. 5b
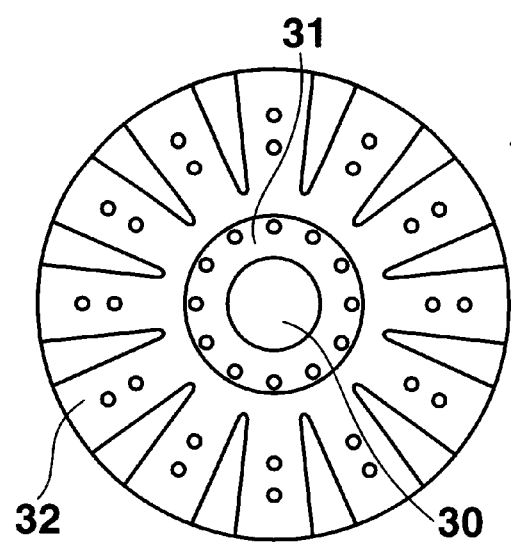
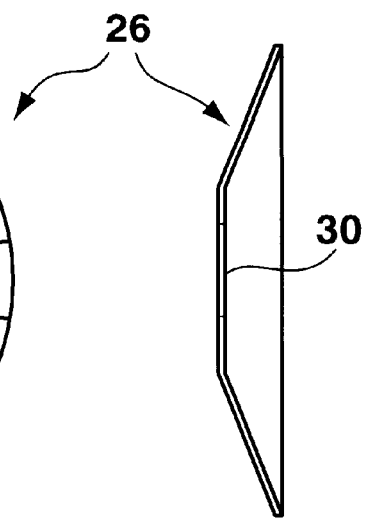
Fig. 6a  Fig. 6b

DEVICE FOR PASSING THROUGH PIPES

This application claims Paris Convention Priority of German patent application number 197 46 510.2 filed Oct. 22, 1997 the complete disclosure of which is hereby incorporated by reference.

BACKGROUND OF THE INVENTION

The invention concerns a device for passing through pipes in the form of a pig moved through the pipe and guided along the inner walls thereof with at least one pig body and with support elements disposed on its outer periphery for guiding in the pipe as well as drive elements in the form of collars for advancement within the pipe.

Pigs are used in pipelines, in particular for oil and gas transport, to locate defects in the pipe, for cleaning the pipe, and the like. They are thereby normally advanced through the pipe by the medium being transported e.g. oil. Intelligent pigs carry out the most differing of measurements, such as pipe wall measurements to e.g. detect local corrosion, wall thickness weaknesses caused by mechanical damage, pitting etc. Depending on the job at hand, differing types of sensor units are utilized, such as leakage sensors, Hall effect sensors, electro-optical sensors, ultrasound sensors or the like.

In order to be able to advance the pig within the pipe using the medium transported therein, the pig has a pig body comprising collars which seat tightly on the inner side of the pipe and are subjected to the flow pressure of the medium being transported.

In order to be able to check pipes which are under water or below the earth's surface, each pig must be introduced into the pipes through an entrance location. In particular for the case of underwater conduits, this is extremely expensive, since complicated and expensive lock mechanisms having expensive valves must be provided therefor. To effect entrance, it is then necessary for a diver to dive to substantial depths in order to be able to introduce the pig into the pipe being examined. Since the pipes for the medium being transported, e.g. oil, are laid at up to 300 m of depth in water and since they have a substantial diameter of e.g. 42 inches, such an entrance lock mechanism having a diameter of this size cannot be passed from the bottom up to the surface of the water, since the weight of such a entrance pipe would be prohibitive.

For this reason, it is the underlying purpose of the invention to create a device of the above mentioned kind which facilitates a simple entrance into a pipe conduit while avoiding the above mentioned disadvantages.

SUMMARY OF THE INVENTION

This purpose is achieved in accordance with the invention with a device for inspection of pipes of the above mentioned kind in that at least one of the collars is configured in a radially expandable fashion. The radial expansion preferentially is effected by pivoting.

The solution in accordance with the invention allows the pigs to be introduced through entrance pipes having small diameters e.g. a diameter of 28 inches (corresponding to approximately 60 cm) and into a main conduit of 40 inches (corresponding to 1 m). The collars effecting the advancement have a smaller diameter in the entrance pipe which first expands into one of larger diameter upon entrance into the main pipe. In this manner, advancement of the inspecting pig can be reliably effected both in the entrance pipe as well as in the main pipe.

A preferred embodiment provides that the expandable collar has an expanded diameter which is larger than that of collars whose radius is constant. Whereas the former expandable collars serve for transport of the pig in the main conduit or pipe of 42 inches, the collars having a non-changing radius provide for transport in the entrance pipe having a diameter of 28 inches.

At least one of the collars having fixed radius is preferentially disposed as a nose on the front side of the pig facing the direction of motion. These so-called "nose collars" serve for reliable drive of the pig in the entrance pipe and for removing the pig from the entrance pipe.

In a further improvement, the radially expandable collars are self-expanding. No auxiliary measures are thereby needed to erect the collars upon transition from the entrance pipe into the main pipe so that they assume their expanded position in the transitional region automatically and reliably. In order to achieve this, the radially expandable collars preferentially comprise a spider which can angle-off about the periphery thereof at least once opposite to the drive direction of the pig and having a plurality of radially extended braces as well as at least one sealing disc disposed on the braces and made from flexible material. The spider is preferentially made from polyurethane. The spider guarantees the folding-up of the collar in the entrance pipe of smaller diameter so that the collar is inactive during this time, while simultaneously effecting erection of the collar when passing from the entrance pipe into the main pipe. The spider furthermore keeps the collar stiff during passage of the pig through the pipe being inspected. The sealing disc reliably seals those regions of the spider which are left open by the radially extending braces so that the medium reliably interacts with the collar to drive the pig.

A further improvement prevents the expandable collar from flipping over during expansion in that the expandable collar is held in its expanded position by anchor elements which can seat on the pig body prior to expansion and are fixed thereto. These elements are preferentially flexible members such as chains. The anchor elements can also however be telescoping elements or could be rods in linked connection with another. A combination of these types of anchor elements is also possible.

In order that the expandable collars are pressed against the pipe to be inspected when they are loaded by the flow pressure, the collars preferentially have a substantially plate-like shape when expanded. The collar serving as the nose element is preferentially ring shell shaped.

In a further preferred embodiment, radially expandable support and guide rollers are provided (relative to the drive direction of the pig) behind each expandable collar. These support and guide rollers, in a further improvement, are fixed on arms which can be outwardly displaced to seat at the inner wall of the pipe under the action of a spring force. This type of support and guide rollers or roller sets formed by such support and guide rollers, guide the pig body along the inner wall of the pipe. The roller sets align the moving pig within the pipe and reduce wear on the outer periphery of the collar. Since these roller sets are also expandable in the radial direction, they can likewise seat on the pig body during introduction through the entrance pipe or can be slightly separated from the pig body to also provide for alignment of the pig in the entrance pipe during the entrance process.

A further preferred embodiment provides that the pig comprises two pull units linked to each other and having support and guide rollers of which only the (as seen in the drive direction) first pull unit has an expandable collar. The first unit thereby serves as the actual pull unit to guarantee the drive function during inspection in the main pipe. The second pull unit secures the drive during transition from the narrower entrance pipe into the larger main pipe. In order to guarantee sufficient stability for the individual pull units, each pull unit is thereby provided with at least two sets of support and guide rollers. In addition, at least one collar having a non-changing radius is provided for on each pull unit which is substantially disc-shaped. These collars guarantee drive in both pull units and thereby the transport of the entire pig. If the first pull unit is already located in the main pipe during the transition from the entrance pipe into the main pipe, wherein its collar is radially erected, the drive function is assured during this time by the second pull unit and the collar disposed thereon, still located in the entrance pipe. When the second pull unit enters into the main pipe, the collars as well as the support and guide rollers of the first pull unit have already been erected to guarantee continued motion in the main pipe. The flat configuration for the additional collar takes into consideration the limited space on the pull unit and in the entrance pipe.

After the pig has reached the main pipe, pig drive is effected by the first pull unit and the expandable collars disposed thereon along with the support and guide rollers and the second pull unit is no longer needed for stabilizing the first pull unit and for drive purposes. In accordance with an improvement, the second pull unit acting as a guide unit is therefore axially displaceable relative to the first unit. It can thereby move towards the pig inspection units and stabilize the pig.

Further advantages and features of the invention can be derived from the claims and the following description in which an embodiment is described in greater detail with reference to the drawing.

BRIEF DESCRIPTION OF THE DRAWING

FIG. 1 shows a complete inspection pig in the expanded state as assumed in a pipe of large diameter;

FIG. 2 shows the inspection pig of FIG. 1 in an entrance pipe having a narrower diameter and in a compressed introduction state;

FIG. 3 shows a side view of the first pull unit of a pig;

FIG. 4 shows a side view of a second pull unit of the inspection pig;

FIG. 5a shows a plan view of a reinforcement section of an expandable collar forming a spider;

FIG. 5b shows a side view of the reinforcement section of FIG. 5a;

FIG. 6a shows a plan view of a sealing ring connected to the reinforcement section of FIGS. 5a and 5b; and FIG. 6b shows a side view of the sealing ring of FIG. 6a.

DESCRIPTION OF THE PREFERRED EMBODIMENT

The pig 1 shown in FIG. 1 has, in the embodiment shown, six individual modules of which the first module 2 is a pull unit, the second module 3 is a pull and guide unit 3, the third and fourth modules 4 and 5 are inspection units and the fifth and sixth modules 6 and 7 are an electronic unit 6 and a power supply unit 7. The electronic unit 6 generally has the processing and memory devices and the power supply unit 7 generally has batteries or rechargeable batteries to supply the electronic unit 6, the sensors etc.

The individual modules 2 through 7 are each guided in the pipe via support and guide rollers 8a–f which are pushed outwardly under spring force against the inner wall of the pipe. Motion of the pig 1 in the pipe is effected by the flow pressure of the medium passing through the pipe, e.g. oil, acting on the collars 9, 10a, 10b, 11, 12 disposed on the pull units 2, 3. In the embodiment shown, the collars 9, 11 and 12 are adapted for use in a pipe having a narrow diameter in the region between 26 and 28 inches. The collars 10a, 10b are inactive in such a narrow pipe but, during transition of the inspection pig 1 into a second pipe having e.g. a diameter on the order of 40–42 inches, pivot (rather than spread-out) to radially expand and assume the drive function for the pig 1. The narrow pipe in the embodiment shown is the entrance pipe 13 for introducing the pig 1 into the main pipe which is being inspected.

The two inspection units 4, 5 have pole pieces 14, 14a on their outer periphery in the form of brushes. A sensor 15 is disposed between each pair of successive pole shoes of an inspection unit. The sensors 15 can e.g. be magnetic sensors for checking the main pipe for defects, cracks or the like. The sensors 15 are also radially expanded up to the periphery of the pipe as can be seen by comparison to FIGS. 1 and 2.

The modules 2, 3, 4, 5 form pig bodies, seat on guide rods 16, 17, 18, 19 and are connected to each other via linkages 20, 21, 22. An additional linkage 23 is provided between the inspection unit 5 and the electronic unit 6, and the electronic unit 6 is connected by means of a linkage 24 to the power supply unit 7.

The linkages 20–24 in accordance with the invention allow the pig 1 to also be guided through pipes having small radius of curvature. The described configuration of the inspection pig 1 is only exemplary to illustrate the invention and other arrangements for the modules 4–7 can be provided for. For example, they can be integrated with each other or can be combined with other units.

Whereas FIG. 1 shows the inspection pig 1 in the expanded state, the inspection pig in FIG. 2 is shown in its compressed state during introduction through the entrance pipe 13. Both the pull units as well as the inspection units are thereby radially compressed and also the support and guide rollers 8e, 8f of the modules 6, 7 also seat radially on their respective pig bodies 25, 26. During this entrance state represented in FIG. 2, the radially expandable collars 10a, 10b in accordance with the invention as well as the sensors 15 of the inspection units 4, 5 are radially compressed. The collars 10a, 10b and the sensors 15 radially expand only after entry into the main pipe.

FIG. 3 shows the front pull unit 2 in the expanded state and thereby the operational state of the pig 1. In other words, the two collars 10a, 10b serving for drive are expanded by pivoting and their radius is thereby adjusted to the larger diameter of the main pipe to be inspected.

The radially expandable collars 10a, 10b are substantially plate-shaped in their expanded position and comprise a spider 24 constituting a frame as well as a sealing disc 26 disposed on the spider 25. The collar can preferentially be made from a single piece. The spider 25 comprises a ring 28, having a circular opening 27, on which braces 29 extend in a radially outward direction, distributed evenly about the outer periphery thereof. These braces 29 can thereby be angle-off relative to the ring 28 or can pivot under the action of a radial force. The sealing disc 26 likewise has a circular opening 30 which is aligned with the circular opening 27 of the spider 25 as well as a ring 31 having a circular opening 30 which is aligned with the ring 28 of the spider 25. This ring 31 is surrounded by a second ring 32 introduced as a sealing skin onto the braces 29 to elastically seal the spaces between the braces 29. The thickness of this ring 32 thereby changes about its girth. In the region between the braces 29, the thickness is somewhat less that in the region of the braces 29 to effect a larger degree of flexibility.

As a comparison to FIGS. 1 and 2 shows, the expandable collars 10a, 10b are initially folded back during the entrance procedure in opposition to the entrance direction indicated by arrow A via their braces 29 and then erect themselves to assume a radially expanded position effected by a pivoting motion from the back towards the front into the plate-shaped expansion position of the collars 10a, 10b. In other words, the radial expansion in accordance with the invention is not effected through a pure radial displacement by spreading-out of elements of the collar in an outward direction, rather by a pivoting motion of the braces 29 and of the sealing disc elements attached thereto. In order that the braces 29 and the sealing discs 26 attached thereto do not flip over during erection in the drive direction (indicated by symbol B) and maintain the convex-concave shape of the collars 10a, 10b, the collars 10a, 10b are fixed to the pig body 16 at their plate-shaped inner side, that is to say the side 34 facing away from the drive direction B, via anchor elements 33a, 33b, in this case, in the form of chains. Towards this end, eyelets 35a, 35b are mounted in the region of the struts 29 to the plate-shaped inner side 34 of the collars 10a, 10b. The collars 10a, 10b are provided with anchor plates 36a, 36b in the vicinity of the struts 29 on their inner 34 as well as their outer sides to secure attachment of the eyelets 35a, 35b. The anchor chains 33a, 33b are then suitably anchored at their ends 37a, 37b facing away from the collars 10a, 10b.

The support and guide rollers 8a disposed (relative to the drive direction B) behind the collars 10a, 10b are likewise fixed for pivoting to the pig body 16 via arms 38a. The roller sets comprising the support and guide rollers 8a as well as the arms 38a can likewise seat, in opposition to the direction of entrance A in FIG. 2, on the pig body 16 and subsequently radially erect through pivoting from the back towards the front. The pivot angle is thereby smaller than 90°.

For folding-up as well as pivoting out, the arm 38a is fixed to a pivot element or lever 39a at its end opposite the mounted support and guide rollers 8a, the pivot element having an end 46a fixed for pivoting to a frame 41a attached to the pig body 16. Its other end 42a is borne for pivoting at an end of a spring element 43a. This spring element 43a moves in the direction of arrow B for folding in the support and guide rollers 8a to thereby displace pivot element 39a at its end 42a facing the spring element 43a. The arm 38a is correspondingly pivoted toward the pig body 16. An opposite motion is effected for radial erection.

The same erection mechanism and configuration is used in the roller set of the second pull unit 3 having the support and guide rollers 8b. The same components are thereby indicated with the same reference symbols.

As shown in FIGS. 3 and 4, the collar 11, 12 configured as a sealing disc is disposed in front of the second collar 10b and the second roller set in each case.

The collar 9, provided as a drive element during the entrance phase and having a ring disc shape, is disposed at the (relative to the travel direction B) front end 44. It has an appropriate pull element 45 on its front side for removal at the extraction location.

We claim:

1. A device for passing through pipes in the form of a pig moving through the pipe and guided on an inner pipe wall, the device comprising:
   a pig body;
   support elements disclosed on a periphery of said pig body for guidance in the pipe;
   at least one seal member mounted to said pig body for advancement of the pig through the pipe; and
   means for radially expanding said seal member when said pig body passes from a first pipe having a first standardized diameter into a second pipe having a second standardized diameter substantially larger than said first standardized diameter, wherein said radially expanded seal member has a plate-like shape and seats on an inner wall of said second pipe to drive the device in response to forces exercised on said seal member by a fluid medium transported through said second pipe.

2. The device of claim 1, wherein said seal member radially expands by pivoting.

3. The device of claim 1, further comprising a collar-member disposed on said pig body, said collar member having a fixed diameter, wherein said seal member has a diameter in an expanded state which is larger than said collar member diameter.

4. The device of claim 3, wherein said collar member is disposed as a nose on a front end of the pig.

5. The device of claim 4, wherein said collar member has a substantially ring shell shape.

6. The device of claim 1, wherein said seal member is self-expanding.

7. The device of the claim 1, wherein said seal member comprises a spider having means for angling-off in a peripheral direction opposite to a drive direction of the pig, said spider having a plurality of radially extending braces, said seal member also comprising a sealing disc disposed on said braces and made from flexible material.

8. The device of claim 7, wherein said spider consists essentially of polyurethane.

9. The device of claim 1, further comprising anchor elements for holding said seal member in an expanded position, said anchor elements seating on said pig body prior to expansion and being attached thereto.

10. The device of claim 9, wherein said anchor elements are flexible.

11. The device of claim 9, wherein said anchor elements comprise chains.

12. The device of claim 9, wherein said anchor elements comprise telescoping elements.

13. The device of claim 9, wherein said anchor elements comprise rods in linked connection with another.

14. The device of claim 1, wherein said support elements comprise radially expandable support and guide rollers disposed behind each said at least one seal member.

15. The device of claim 14, wherein said support elements comprise arms to which said support and guide rollers are mounted, said arms for displacing said rollers onto an inner wall of the pipe under an action of a spring force.

16. The device of claim 1, wherein said pig body, said support elements, and said at least one seal member cooperate to form a first pull unit, and further comprising a second pull unit disposed downstream of said first pull unit and a linkage connecting said first and said second pull units, said second pull unit comprising support and guide rollers, wherein only said first pull unit comprises an expandable seal member.

17. The device of claim 16, wherein said first and said second pull units each comprise at least two sets of support and guide rollers.

18. The device of claim 16, wherein said first and said second pull units each comprise of least one substantially disc-shaped collar of constant diameter.

19. The device of claim 16, wherein said linkage is for axial displacement of said second pull unit relative to said first pull unit, whereby said second pull unit functions as a guide unit.

* * * * *